United States Patent [19]

Lo

[11] Patent Number: 5,281,035
[45] Date of Patent: Jan. 25, 1994

[54] OIL PROOF CONSTRUCTION AND ROTATING SHAFT IMMOBILIZING MEANS OF OIL-CONTAINING BEARING

[75] Inventor: Jansen Lo, Taoyuan, Taiwan

[73] Assignee: Delta Electronics, Inc., Taoyuan, Taiwan

[21] Appl. No.: 899,715

[22] Filed: Jun. 17, 1992

[51] Int. Cl.⁵ ............... F16C 33/02; F16C 33/10
[52] U.S. Cl. ................... 384/279; 384/135; 384/286
[58] Field of Search ............... 384/279, 286, 289-292, 384/397, 415, 902, 135

[56] References Cited

U.S. PATENT DOCUMENTS

| 3,074,768 | 1/1963 | Abel | 384/279 |
| 3,140,131 | 7/1964 | Tann | 384/291 X |
| 3,188,153 | 6/1965 | Turk | 384/135 |

FOREIGN PATENT DOCUMENTS

| 74746 | 6/1977 | Japan | 384/902 |
| 140044 | 10/1979 | Japan | 384/286 |

Primary Examiner—Thomas R. Hannon
Attorney, Agent, or Firm—Bacon & Thomas

[57] ABSTRACT

An improvement in the leak proof construction and the rotating shaft attachment means for an oil-containing bearing includes a plurality of oil-storing grooves formed on the oil-containing bearing such that the lubricant oil required by the rotation of the rotating shaft can be received and contained therein. On an outlet portion of the rotating shaft and the oil-containing bearing, there is provided an oil guiding plate which rotates with the rotating shaft. The lubricant oil escaping along the rotating shaft will be expelled by the oil guiding plate into the oil-storing grooves of the oil containing bearing by the centrifugal force generated by the rotation of the oil guiding plate. Moreover, in the attachment means for the rotating shaft extending out of the bearing, an insert block is placed in a bearing socket with a central groove or a protrusion before it is mounted around the end portion of the rotating shaft extending out of the bearing, such that the noise generated during rotation of the shaft is greatly reduced.

3 Claims, 7 Drawing Sheets

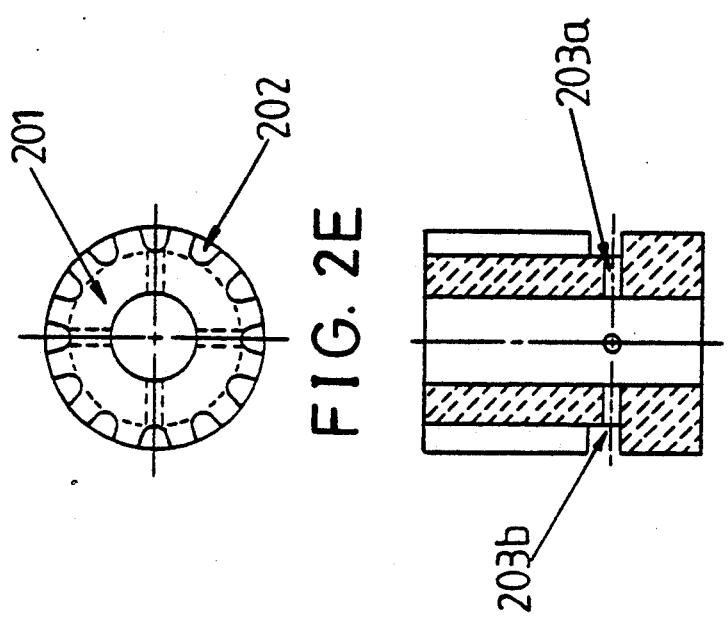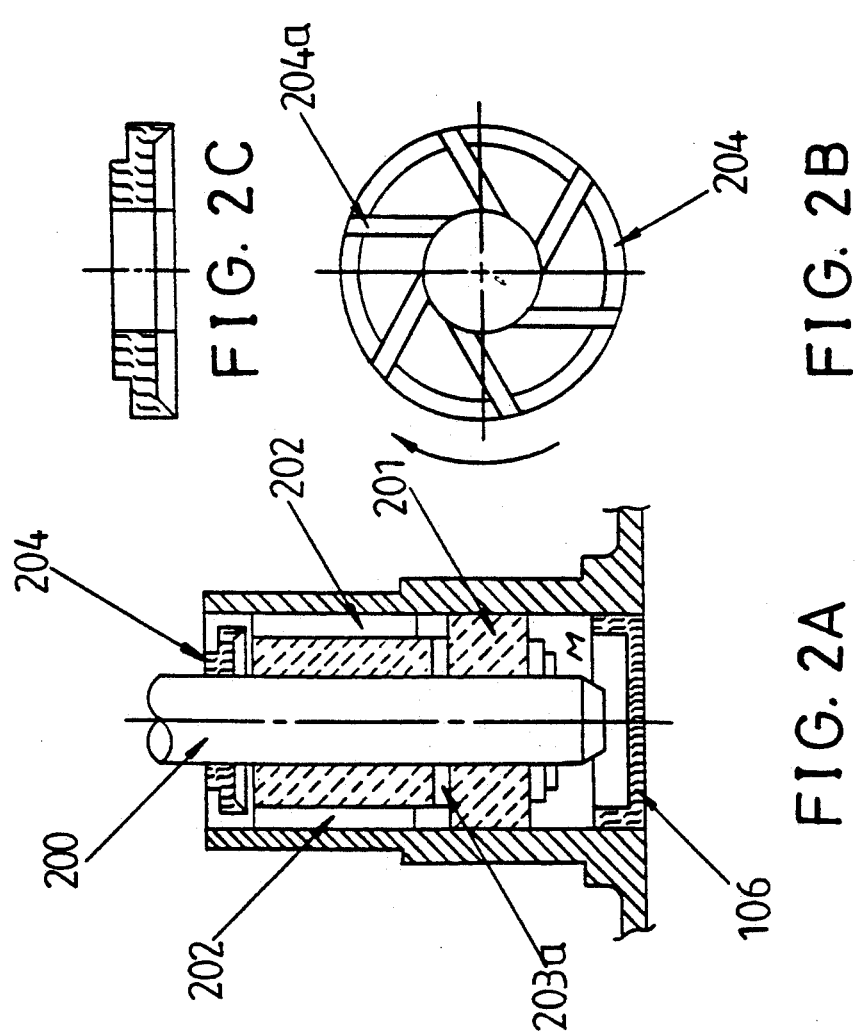

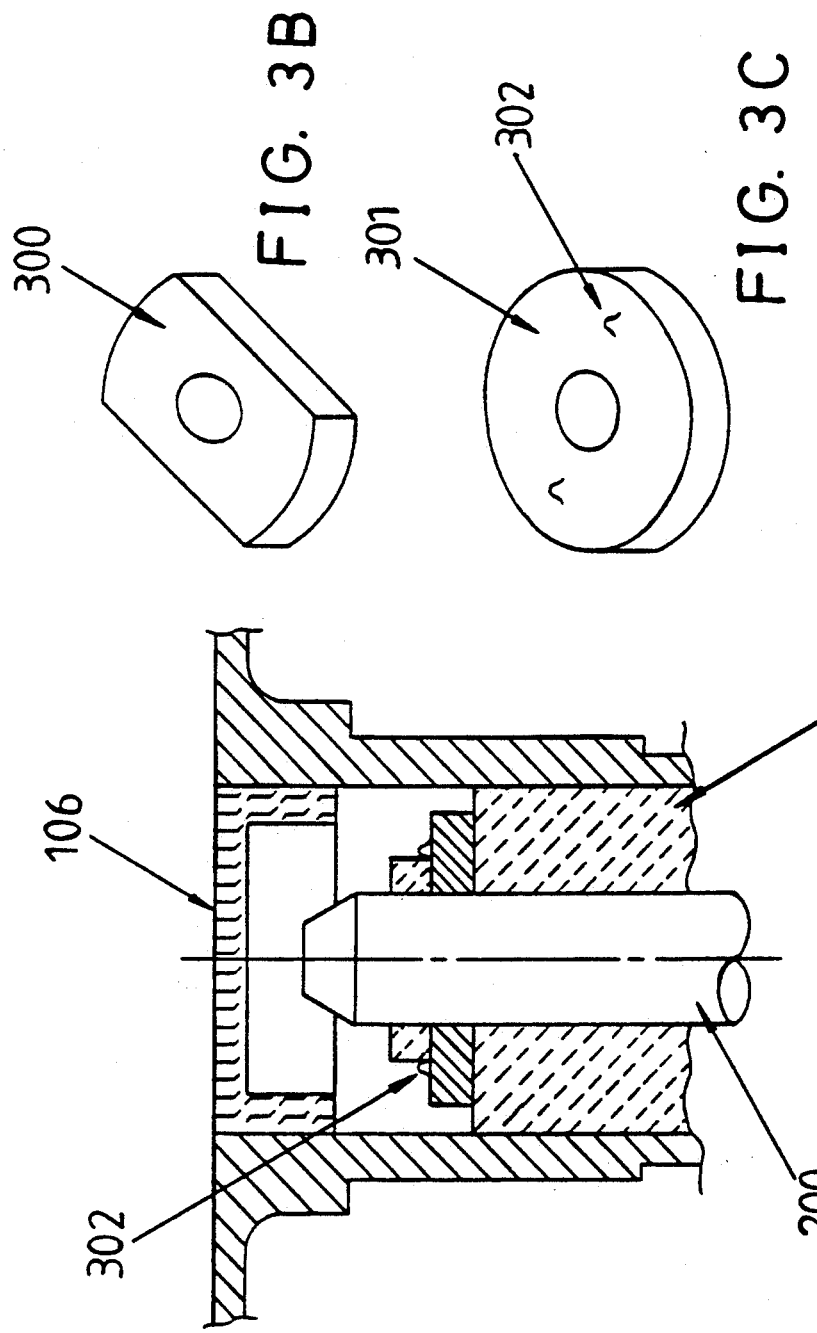

OIL PROOF CONSTRUCTION AND ROTATING SHAFT IMMOBILIZING MEANS OF OIL-CONTAINING BEARING

BACKGROUND OF THE INVENTION

1. Field of the Invention

The present invention relates to an improved leak-proof construction and the rotating shaft attaching means for an oil-containing bearing, particularly, such a bearing having a plurality of oil-storing grooves in a spaced circumferential arrangement, two oil guiding holes for increasing the lubrication effect between the rotating shaft and the bearing, and an oil-guiding plate for preventing lubricant oil leakage provided on the rotating shaft. Also, an insert block and a bearing socket with a central groove or protrusions and mounted on an end part of the rotating shaft extending out of the bearing reduces the noise during rotation of the shaft by forming wedge film, such that an oil film will be generated between the bearing socket and the oil containing bearing to reduce axial friction forces therebetween.

2. Description of the Prior Art

An oil-containing bearing used in a conventional system is shown in FIGS. 1A and 1B which are views showing the construction of a bearing in a venting fan used for cooling electronic equipment. It can be seen from FIG. 1B, the component members of the bearing 100 installed in this fan and from FIG. 1C the structure of the aforementioned conventional oil-containing bearing, wherein at the end portion of the rotating shaft 102 extending out of the oil containing bearing 101 in a downward direction, there are provided C-clip 103, an O ring 104 and a washer 105 respectively. The front end of the oil containing bearing 101 is further provided with a seal 106. The O ring 104 is sandwiched between the C-clip 103 and the washer 105 and pressed against the end portion of the rotating shaft 102. However, the O ring is made of the usual rubber material and has an extremely high friction coefficient. A friction force is produced when the O ring is pressed tightly against the end portion of the rotating shaft by the washer 105 and the C-clip 103 resulting in an impedement for the rotation of the rotating shaft. The above disadvantage not only increases the power loss (w) of the shaft, but also increases the noise of rotating shaft during its rotation. It is known that in manufacturing conventional oil containing bearing, after the process of powder casting, the bearing must be sintered so as to obtain considerable machinery strength. While in the process of sintering, there are two conditions which cause the formation of holes: 1) the remaining spaces between particles (as shown in FIG. 4A); 2) the holes originally occupied by metal particles of low melting point (as shown in FIG. 4B). The temperature for the sintering oil containing bearings of copper families is about 700° C.–800° C. It is known that there is 9–11% of tin in copper families materials, however, the melting point of tin is 232° C., while that of copper is 1083° C. As the copper is sintered in 700° C.–800° C., the spaces originally occupied by the low melting point tin are formed as oil containing holes for containing lubricant oil (as shown in FIG. 4C). Thus when the shaft 102 is rotating in self-lubricated bearing 101, the capillary action (as shown in FIG. 5) as well as the heat generated from friction, causes the lubricant oil to permeate out of the oil containing holes in the bearing for lubricating the shaft (as shown in FIG. 6). However, the continuous rotation of the shaft causes the oil to brim over the oil-containing holes out of the portion in contact with the rotating shaft (as shown in FIG. 1D). The lubricant oil inside selflubricated bearing then permeates out of the rotation shaft continuously. In this condition, the lubricant oil leaking out of the bearing not only pollutes the electric elements, but also shortens the life of the bearing because of the loss of lubricant oil. These are the defects which most often occur in known self-lubricated bearings. Furthermore, the combination of an oil-containing bearing and a rotation shaft containing an O-ring, consumes rotational energy due to frictional forces generated during rotation of shaft. There is a known combination without an O-ring, however, this combination of oil-containing bearing and rotation shaft cannot reduce the above-mentioned friction force generated between the bearing and the washer during relative motions. Moreover, there is no buffering effect against axial forces.

SUMMARY OF THE INVENTION

Thus, an object of the invention is to provide an improvement in the leak proof construction of an oil-containing bearing by providing a plurality of oil-storing grooves in a successive annular arrangement on the oil containing bearing for supporting the rotation of the rotating shaft and an oil guiding plate provided on the outlet portion of the rotating shaft and the oil containing bearing. Oil guiding spacers provided on the oil guiding plate in the form of a tangent protrusion will expel the lubricant oil spilled out of the rotating shaft into the oil-storing grooves in the bearing such that the lubricant oil will not spill out of the bearing.

Another object of the invention is to provide an improvement in the leak proof construction of an oil-containing bearing which contains a ring-shaped oil guiding groove formed on the surface of the bearing and two oil guiding ports through a central hole. As a result, the lubricating effect is improved.

A further object of the invention is to provide an improvement in the leak proof construction of an oil-containing bearing in which an insert block is placed in a bearing socket with a central groove or protrusion before it is mounted surrounding the end portion of the rotating shaft extending out of the oil containing bearing to reduce the noise during rotation of the rotating shaft by using a wedge film, such that an oil film will be generated between the bearing socket and the oil containing bearing and such that there is no axial friction forces therebetween.

A more complete understanding of these and other features and advantages of the present invention will become apparent from a careful consideration of the following detailed description of certain embodiments illustrated in the accompanying drawings.

BRIEF DESCRIPTION OF THE DRAWINGS

FIG. 2A is a cross-sectional view of an oil containing bearing according to the present invention.

FIGS. 2B and 2C are top and cross-sectional views of the oil guiding plate shown in FIG. 2A.

FIGS. 2D and 2E are cross-sectional and top views of the oil-containing bearing shown in FIG. 2A.

FIG. 3A is a partial, cross-sectional view illustrating the shaft attaching device according to the present invention.

FIG. 3B is a perspective view of the insert block shown in FIG. 3A.

FIG. 3C is a perspective view of the bearing socket shown in FIG. 3A.

DESCRIPTION OF THE PREFERRED EMBODIMENTS

Figure 1A:
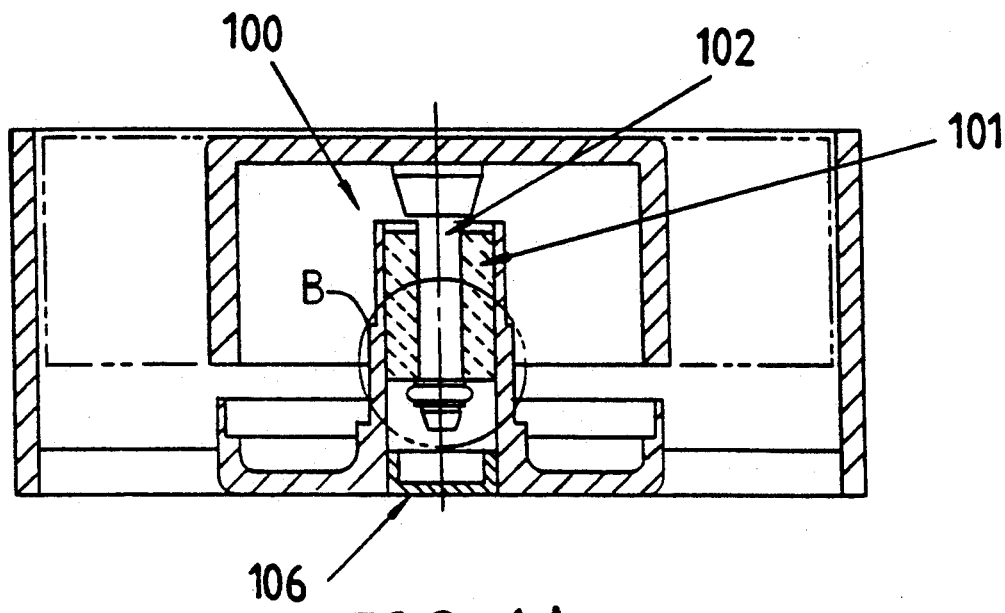
FIG. 1A is a cross-sectional view of a known oil-containing bearing structure.
Figure 1B:
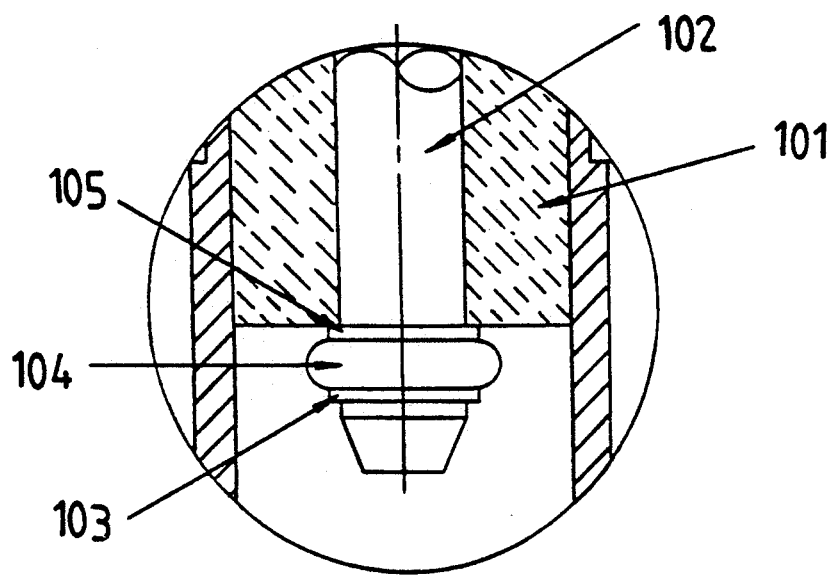
FIG. 1B is an enlarged cross-sectional view of the area B in FIG. 1A.
Figure 1D:
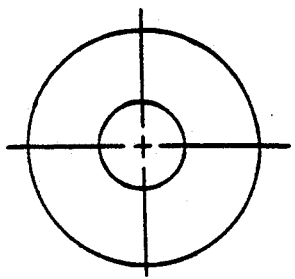
FIGS. 1C and 1D are cross-sectional and top views of a known oil-containing bearing.
Figure 1C:
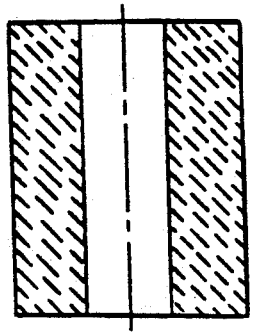
Figure 1E:
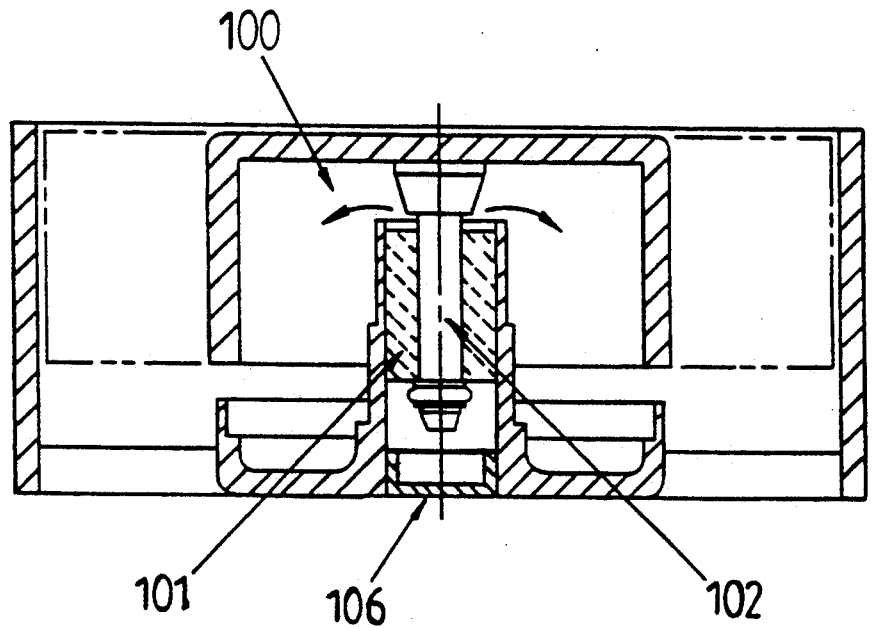
FIG. 1E is a cross-sectional view of a known oil-containing bearing structure illustrating oil leakage.
Figure 4A:
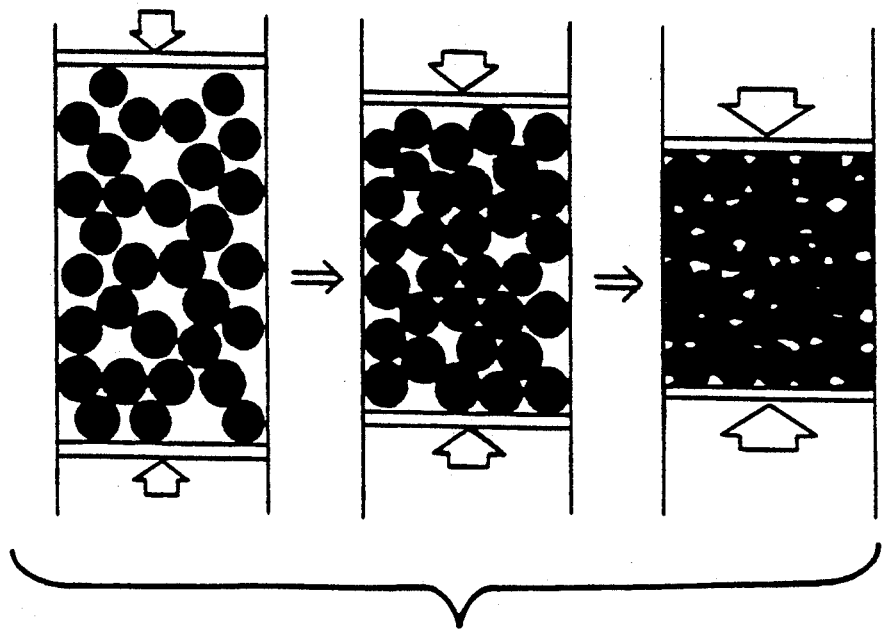
FIGS. 4A, 4B, 4C are schematic diagrams showing the distribution of inner spaces or holes in oil-containing bearings.
Figure 4B:
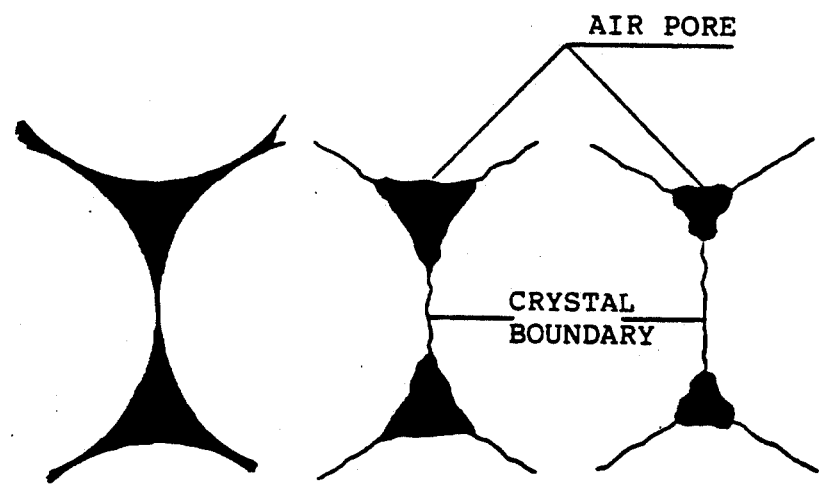
Figure 4C:
Figure 5:
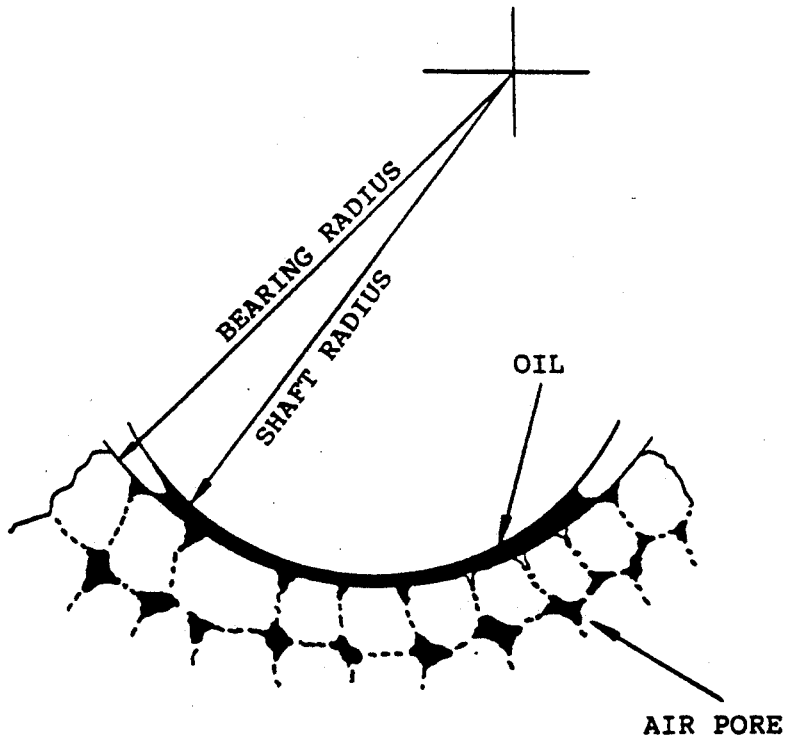
FIG. 5 is a schematic diagram showing the capillary action generated at the contact point between the shaft and the oil-containing bearing.

FIGS. 1A and 1B illustrate the construction of a conventional oil-containing bearing. The detailed structure and the shortcomings in use of which have been described as above and will not be repeated here.

Figure 6:
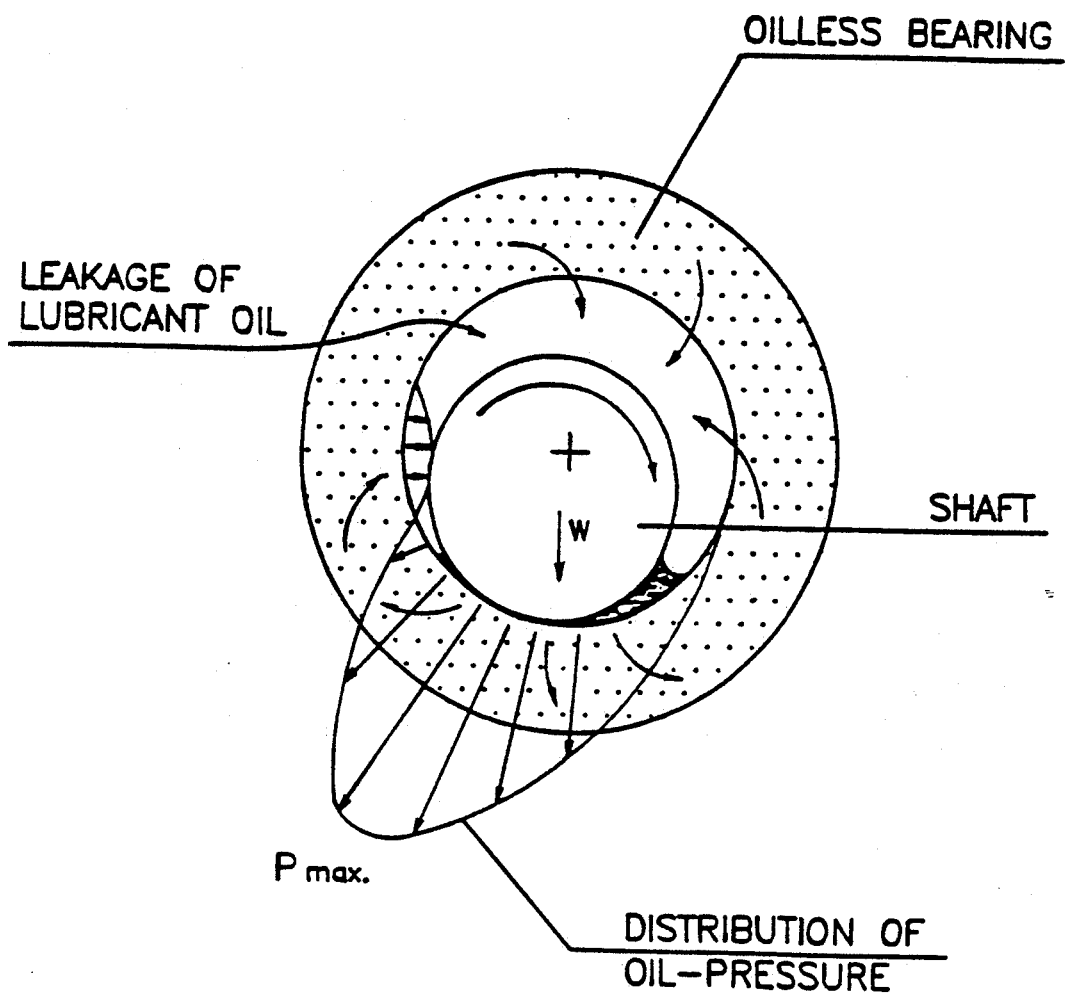
FIG. 6 is a schematic diagram showing the flow and distribution of oil-pressure of the lubricant oil inside the oil-containing bearing.

FIG. 2A shows the leak proof means of the bearing according to the invention. From this figure, we can see that there are a plurality of oil-storing grooves 202 circumferentially spaced about and formed on the oil containing bearing 201 for supporting the rotating shaft 200 inside of the bearing. At this point, please also refer to the FIG. 2D showing a cross-sectional view of the oil-containing bearing 201. On the outer circumference of the oil containing bearing 201 are formed a plurality of oil-storing grooves 202 for receiving and storing the lubricant oil required by the rotating shaft. On the annular portion of the oil containing bearing 201, an oil-guiding port 203a is formed as a through hole connecting a ring-shaped oil-guiding groove 203b on the surface of the bearing with a internal bore to introduce the lubricant oil contained in the oil-storing grooves 202 onto the rotating shaft 200 such that the contact interface between the outer surface of the rotating shaft and the oil containing bearing is separated by lubricant oil in order to cut down the generation of the friction force. The space M between the oil containing bearing 201 and the seal 106 is filled up with the lubricant oil. Furthermore, the other end of the rotating shaft 200 extending outside of the bearing 201 is covered and provided with an oil guiding plate 204. The construction of the oil guide plate 204, which can be seen in FIGS. 2B and 2C, is an annular body with a centrally located round hole that can be mounted onto the rotating shaft. Tangent-like oil guiding spacers 204a are formed extending from the outer border of the round hole. When the oil guiding plate 204 is mounted onto the rotating shaft 200 and rotated together with the rotating shaft 200, the lubricant oil which has permeated through the gap between the contact faces of the rotating shaft 200 and the oil containing bearing 201 capillary action, the lubricant oil flows out to the oil guiding plate 204. It is then guided through the oil-guiding spacers 204a on the oil guiding plate and expelled by the centrifugal force generated by the rotation of the oil guiding plate into the oil storing grooves of the oil containing bearing. The lubricant oil expelled into storing grooves 202 flows to the space between oil containing bearing and rotating shaft by means of oil guiding groove 203b and oil guiding port 203a, to improve the lubricating effect. In addition, when the rotating shaft stops, the lubricant oil inside storing groove 202, oil-guiding port 203a, and oil-guiding groove 203b is absorbed back into said oil-containing bearing due to temperature differences. As a result, the rotating shaft is suitably lubricated inside the oil-containing bearing. Furthermore, there is sufficient lubricant oil between the rotating shaft and oil containing bearing, as the rotating shaft rotates, that a pressure P is generated to support a load W (as shown in FIG. 6). In this condition, since the rotating shaft and oil containing bearing are not in contact with each other, there is no friction between them and the noise is reduced. The lubricant oil is contained in the space M so that it will not leak out of the bearing along the outer surface of the rotating shaft.

FIG. 3 illustrates the construction of the locking means for the rotating shaft of the invention. An insert block 300 is placed in the bearing socket 301 formed either with a groove in the center or protrusions 302. Socket 301 is provided surrounding the end of the rotating shaft 200 extending out of the oil containing bearing 201. The bearing socket 301 thereof can be made of wear resistant material having the same properties as that of rotating shaft 200, while its surface in contact with the bearing is very smooth. The insert block 300 thereof is made of soft metal material, such as copper. On the bearing socket 301, there are grooves or protrusions 302 for preventing relative motion between insert block 300 and bearing socket 301. When the bearing socket 301 is mounted onto the rotating shaft 200, and the insert block 300 is put into rotating shaft 200, the combination rotates simultaneously, because of contact between the protrusions 302 on the bearing socket 301 and the insert block 300. If the insert block rotates with rotating shaft, the bearing socket 301 rotates simultaneously. Since the surface roughness of bearing socket 301 and oil-containing bearing are very small, when the rotating shaft rotates, by means of wedge film effect, an oil film generates sufficient pressure therebetween to support an axial load W on rotating shaft. As a result, there is no metal to metal contact between the bearing socket 301 and bearing 201. Thus, the power loss of the rotating means is reduced and the rotational stability of rotating shaft is improved.

I claim:

1. An improvement in the leak proof construction and the rotating shaft attaching means for an oil-containing bearing comprising: a plurality of oil-storing grooves in a spaced, circumferential arrangement defined by the oil containing bearing to receive lubricant oil exiting from an end of the oil-containing bearing along a rotating shaft while the rotating shaft rotates; a central hole defined by the oil-containing bearing; a rotatable shaft extending through the central hole; and an oil guiding hole defined by the oil-containing bearing extending between a groove and the central hole whereby while the shaft is rotating the lubricant oil contained in the oil-storing grooves will be introduced between the rotatable shaft and the oil-containing bearing to enhance the lubricating effect.

2. An improvement in the leak proof construction and the rotating shaft attaching means for the oil containing bearing of claim 1, further comprising an oil guiding plate attached to the rotatable shaft at an end extending out of the oil-containing bearing so as to rotate synchronously with said, rotatable shaft, the oil guiding plate having a plurality of oil guiding spacers in the form of tangent protrusions provided thereon such that, while the oil guiding plate rotates together with the rotating shaft, the lubricant oil exiting from the oil containing bearing along the rotating shaft will be expelled into the oil-storing grooves on the circumference of the oil-containing bearing by the centrifugal force generated by the rotation of the oil guiding spacers.

3. An improvement in the leak proof construction and the rotating shaft attaching means for the oil-containing bearing of claim 2, wherein the attaching means for the rotatable shaft comprises: a bearing socket having protrusions extending from one side thereof; and, an insert block placed on the bearing socket so as to contact the protrusions and attached to a portion of the rotating shaft extending out of the oil-containing bearing so as to rotate in synchronism therewith, thereby minimizing the friction force during rotation of the rotatable shaft.

* * * * *